March 4, 1952 — V. M. DOBEUS — 2,587,711
TRACTOR SEAT
Filed April 23, 1948 — 2 SHEETS—SHEET 1

Inventor
Vander M. Dobeus
by [signature]
Attorney

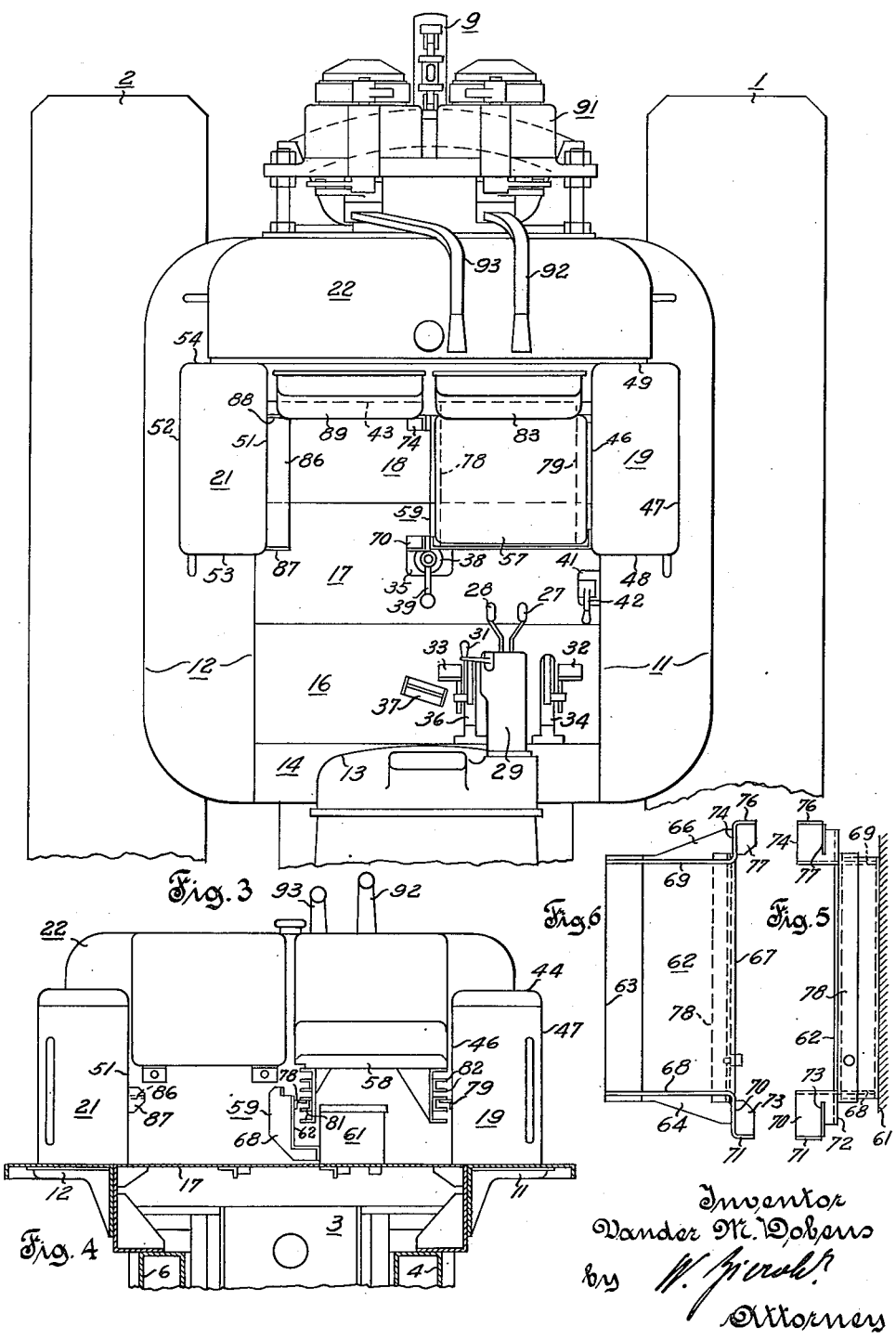

UNITED STATES PATENT OFFICE 2,587,711

TRACTOR SEAT

Vander M. Dobeus, Findlay, Ohio, assignor to Allis-Chalmers Manufacturing Company, Milwaukee, Wis., a corporation of Delaware Application April 23, 1948, Serial No. 22,879

3 Claims. (Cl. 180—1)

The invention relates to tractors, and more particularly to tractors of the type in which a driver and a companion may be seated side by side on a transverse bench seat at the rear of the tractor.

In such tractors, as for instance in the larger types of crawler tractors, manually operable tractor controls are usually arranged in front of the driver's part of the seat, and the companion's part of the seat is usually formed in one piece with the driver's part, that is, a relatively long seat cushion or the like, and a continuous support therefor, of the same length, extend transversely of the tractor from one end of the bench seat to the other.

In connection with such tractors, it is further usual to arrange manually operable control means of allied equipment, such as the control levers of a rear mounted winch or of a self-loading scraper, within rearward reach from the seat, so that the driver may manipulate the controls of the tractor and of the allied equipment from a sitting position. Under these circumstances it is desirable that the driver be able to turn around from his normal forwardly facing driving position to a lateral position from which he can observe trailing equipment behind the tractor, and from which he can reach the equipment controls, as well as the tractor controls. However, the usual bench seat construction and arrangement as heretofore employed, have made it difficult, or at least inconvenient, for the driver to do this, as is well known in the art. The exertion of the driver in looking back and manipulating the equipment controls has been found particularly objectionable during protracted working periods, as in road work, which require more or less constant observation of the trailing equipment and frequent manipulation of the equipment controls.

Attempts have been made during the past to facilitate manipulation of rearward equipment controls in a bench seat tractor, for instance by a special construction of the back rest of the seat, and also to facilitate observation of trailing equipment and manipulation of its controls, for instance, by mounting a one-man bench seat longitudinally at one side of the tractor so that a driver occupying such side seat would confront the other side of the tractor and normally face at right angles to the direction of propulsion. However, such previous attempts are believed to have not been entirely satisfactory, particularly in the matter of converting an ordinary transverse seat tractor into a side seat tractor and of reconverting the side seat tractor into a transverse seat tractor in which a driver may normally be seated in a forwardly facing driving position.

Generally, it is an object of the invention to provide an improved tractor which avoids the above mentioned difficulties and shortcomings of the prior art, and which takes care of the driver's requirements for observation and control of rearward allied equipment in a practical and fully satisfactory manner.

More particularly, it is an object of the invention to provide an improved tractor seat which will enable a driver to optionally place himself into a normal, forwardly facing driving position, or into a convenient sidewise position from which he can observe any trailing equipment that may be hitched to the tractor, and from which sidewise position he can manipulate tractor controls forwardly of the seat, as well as equipment controls rearwardly of the seat, without undue exertion.

A further object of the invention is to provide an improved tractor seat of the hereinabove mentioned character, which is extremely simple in construction, which will not readily be damaged or get out of order under rough working conditions such as are incident to the operation of heavy duty tractors, and which may be manufactured at relatively low costs.

These and other objects and advantages are attained by the present invention, various novel features of which will be apparent from the description herein and the accompanying drawings, disclosing an embodiment of the invention, and will be more particularly pointed out in the appended claims.

Referring to the drawings:

Fig. 3 is a top view of the parts shown in Fig. 1, the seat installation being shown in condition to accommodate only the driver;

Fig. 4 is a view similar to Fig. 2, and showing the seat installation in the same condition in which it is shown in Fig. 3;

Figs. 5 and 6 are top and side views, respectively, on an enlarged scale, of a dual seat support shown in Figs. 2 and 4.

Figure 1:
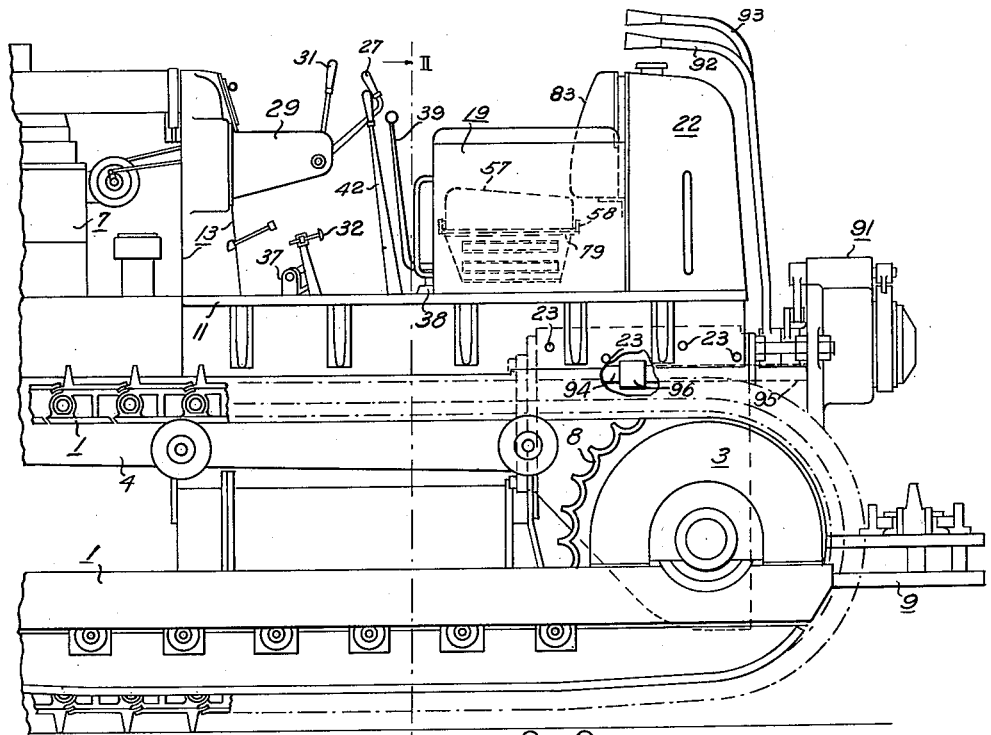
Fig. 1 is a side view of the rear half of a crawler tractor and of allied equipment, in the form of a winch mechanism which is mounted at the rear of the tractor.

In the construction of crawler tractors, it is a customary practice to support a main frame by means of a three-point suspension on a pair of self-laying track units; to mount the engine on a forward part of the main frame; to enclose a power transmitting mechanism, which is operable to vary the drive of the track units, within a relatively large transmission housing which forms a rear part of the main frame; and to provide for control of the tractor from a rearwardly located driver's station on the main frame. The most commonly employed steering principle is that which requires a pair of clutches for interrupting the drive to one or the other of the track units, and a pair of brakes for retarding or arresting the deenergized track unit, as is well known in the art. In tractors which employ this steering principle a pair of manually operable steering levers for controlling the clutches, and a pair of foot levers or pedals for operating the brakes are arranged at the driver's station. A large tank for storing engine fuel is usually mounted at the rear of the driver's station.

The tractor shown in the drawings incorporates the hereinabove outlined general principles of construction and operation. The reference character 1 in Figs. 1 and 2 generally designates a self-laying track unit of the endless track type at the left side of the tractor, and the reference character 2 in Fig. 2 designates a corresponding track unit at the right side of the tractor, the terms "right" and "left" being used in conformity with the orientation of a driver stationed at the rear of the tractor and facing forwardly in the direction of propulsion, that is, toward the left in Fig. 1.

Figure 2:
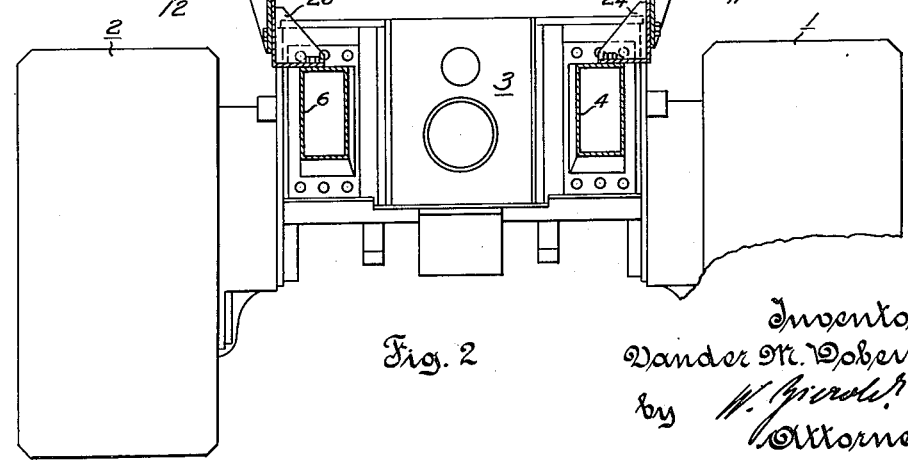
Fig. 2 is a front view of a seat installation shown in Fig. 1, side frame members of the tractor and a deck structure being shown in section on line II—II of Fig. 1, and the seat installation being shown in condition to accommodate a driver and a companion at opposite sides, respectively, of the tractor.

A large transmission housing generally designated in Figs. 1 and 2 by the reference character 3, forms the mentioned rear part of the main frame, and a pair of box section side members 4 and 6 of the main frame are secured at their rear ends to the transmission housing 3 and extend forwardly therefrom at opposite sides of the tractor. An internal combustion engine 7 whose rear end is shown at the left of Fig. 1, is mounted at the forward end of the tractor between the side frame members 4 and 6 and in forwardly spaced relation to the transmission housing 3. A track belt drive sprocket 8 for the left track unit 1, and a corresponding track belt drive sprocket (not shown) for the right track unit 2, are rotatably mounted at opposite sides, respectively, of the transmission housing 3, and are connected through suitable power transmitting mechanism, not shown, in driven relation with the engine 7. The usual steering clutches and steering brakes, not shown, are enclosed in the transmission housing 3. A drawbar structure 9 for hitching a trailing vehicle to the tractor is attached to the main frame in the customary manner and extends rearwardly beyond the transmission housing 3, as shown in Figs. 1 and 3.

A top structure rearwardly of the engine 7 comprises a pair of fenders 11, 12 (Fig. 2), a dash panel 13 (Fig. 1), floor plates 14, 16, 17, 18 (Fig. 3), a pair of battery boxes 19, 21 (Fig. 2) at opposite sides of the tractor, a fuel tank 22 bridging the fenders in rear of the battery boxes, and a seat assembly to be described more fully hereinbelow and which is arranged between the battery boxes 19 and 21 and forwardly of the fuel tank 22.

The left fender 11 has a vertical, substantially rectangular wall part (Figs. 1 and 2) and a horizontal wall part which extends outwardly over the track unit 1, and whose forward and rearward outer corners are rounded as shown in Fig. 3. The fender 11 is secured at a rear portion of its vertical wall part to the left side of the transmission housing 3 by means of bolts 23, and it is supported on the left side member 4 of the main frame by means of a reinforced angle bracket 24 (Fig. 2) which is secured to a forward portion of the vertical wall part of the fender 11 and to the top of the side frame member 4. The right fender 12 is an opposite hand duplicate of the fender 11, and the foregoing explanations with respect to the construction and mounting of the fender 11 analogously apply to the fender 12. Fig. 2 shows a reinforced angle bracket 26 which corresponds to the angle bracket 24, and which connects a forward portion of the vertical wall part of the fender 12 with the side frame member 6.

The dash panel 13 is mounted on the floor plate 14 (Fig. 3) which in turn is secured at its opposite sides to the fenders 11 and 12, and which extends in the same horizontal plane as the horizontal wall parts of the fenders. A pair of steering levers 27 and 28 (Figs. 1 and 3) for operating the steering clutches of the tractor, are pivotally mounted on a bracket 29 which is secured to the dash panel 13 and extends rearwardly therefrom, as shown in Fig. 1. Also mounted on the bracket 29 is a throttle control lever 31 which is pivotally adjustable about the same axis as the steering levers 27 and 28.

The floor plate 16 forms a continuation of the floor plate 14 and it is supported at its opposite ends on the fenders 11 and 12. A pair of relatively adjacent brake pedals 32 and 33 (Figs. 1 and 3) are mounted in upwardly projecting relation to the floor plate 16 and are operable in the usual manner to apply and release the steering brakes of the tractor. The floor plate 16 has a slot 34 (Fig. 3) to accommodate back and forth movement of the brake pedal 32, and another slot 36 is formed in the floor plate 16 to accommodate back and forth movement of the brake pedal 33. A foot rest 37 is mounted on the floor plate 16 at the right side of the brake pedal 33 and a similar foot rest (not shown) is mounted on the floor plate 16 between the brake pedals 32 and 33 and under the dash panel bracket 29.

The floor plate 17 forms a continuation of the floor plate 16, and like the latter, is supported at its opposite ends on the fenders 11 and 12. The floor plate 17 has a central cutout 35 to accommodate a mounting base 38 for a gear shift lever 39, and another cutout 41 at the left side of the tractor to accommodate a master clutch actuating lever 42.

The floor plate 18 is of the same width transversely of the tractor as the floor plate 17 and forms a continuation of the latter, the opposite ends of the floor plate 18 being supported on the fenders 11 and 12, respectively, and the floor plate 18 having a transverse rear edge 43 in forwardly spaced relation to the front wall of the fuel tank 22.

The assembly of the fenders 11, 12 and floor plates 14 to 18 forms a horizontal deck structure rearwardly of the engine 7 and forwardly of the fuel tank 22. The battery box 19 is secured in fixed position on top of the fender 11 and has a padded lid 44 (Fig. 2) to close a top opening of the battery box, the sides of the box being formed by longitudinal vertical side walls 46 and 47 (Fig. 3) and by transverse front and rear walls 48 and 49. The battery box 21 is a duplicate of the battery box 19 and is mounted on top of the fender 12, the longitudinal side walls of the battery box 21 being designated by the reference characters 51 and 52 (Fig. 3), and the front and rear walls of the battery box 21 being designated by the reference characters 53 and 54. The top opening of the battery box 21 is closed by a padded lid 56 (Fig. 2) which, like the padded lid 44 of the battery box 19, is removable to afford access to the interior of the box. The battery boxes 19 and 21 form side members of a rearward operator's compartment on the tractor, the side members extending longitudinally at opposite sides, respectively, of the tractor in transversely spaced relation to each other and affording arm rests of said operator's compartment.

Referring to the seat assembly which, as stated, is arranged between the battery boxes 19 and 21 and forwardly of the fuel tank 22, a seat cushion 57 and a seat section 58 supporting the cushion 57 are shown in dotted lines in Fig. 1, and form a driver's seat rearwardly of the steering levers 27, 28 and brake pedals 32, 33. The seat cushion comprises a rigid, rectangular upholstery frame, not shown, and as shown in Figs. 2 and 3, the width of the seat cushion 57, transversely of the tractor, is somewhat less than one-half of the distance between the relatively opposed side walls 46 and 51 of the battery boxes 19 and 21, respectively. The depth of the seat cushion 57, longitudinally of the tractor, is somewhat less than the length of the battery box 19, the rear edge of the seat cushion being spaced forwardly from the front wall of the fuel tank 22, and the front edge of the seat cushion being spaced a short distance rearwardly from the front wall 48 of the battery box 19, as shown in Figs. 1 and 3. The seat section 58 comprises a rectangular top on which the frame of the seat cushion 57 rests, a left side portion depending from the top at the right side of and in proximity to the battery box 19, and a right side portion depending from the top at the left side of and in proximity to a dual seat support 59 which extends upwardly between the battery boxes 19 and 21, substantially at the center of the tractor.

A tool box 61 (Figs. 2 and 4) is bolted to the floor plates 17 and 18 below the seat section 58, and the dual seat support 59 is secured to the tool box 61 at the side of the latter which faces toward the battery box 21. Referring to Figs. 4, 5 and 6, a heavy gauge sheet metal plate 62 which forms part of the dual seat support 59, extends longitudinally of the tractor in an upright position and has a straight vertical base part which is welded to the mentioned side of the tool box 61, and a straight vertical web part which is offset from the base part toward the battery box 21. The base part of the plate 62 has a straight horizontal bottom edge 63 (Fig. 6), and the web part has a forwardly and upwardly inclined front edge 64, a rearwardly and upwardly inclined rear edge 66, and a straight horizontal top edge 67. The plate 62 is reinforced, at the side thereof which faces the battery box 21, by a plate metal bracket 68 adjacent to the forward end of the plate 62, and by another plate metal bracket 69 adjacent to the rear end of the plate 62.

The bracket 68 is set on edge against the base and web parts of the plate 62 and secured thereto by welding. At its upper end the bracket 68 has a wing portion 70 which is bent forwardly to extend in a horizontal plane and at the side of the plate 62 which faces the battery box 21, and a front part of the wing portion 70 is bent upwardly to form a front stop 71 in a vertical plane at right angles to the plate 62 and at the side of the latter which faces the battery box 21. An edge portion 72 (Fig. 5) of the wing 70 is welded to the top edge 67 of the plate 62, and a vertical plate part 73 on top of the wing 70 is welded at its bottom edge to the latter and at its front edge to the stop 71, the plate part 73 forming a side stop in a vertical plane parallel to the plate 62 and at the side of the latter which faces the battery box 21.

The foregoing explanations with respect to the construction and mounting of the front bracket 68 similarly apply to the rear bracket 69 which is an opposite hand duplicate of the bracket 68. That is, the rear bracket 69 has a horizontally and rearwardly extending wing part 74 and a rear stop 76 which correspond, respectively, to the wing part 70 and front stop 71 of the bracket 68, and a side stop 77 is secured to the wing part 74 and extends in the same vertical longitudinal plane as the side stop 73.

At the side of the plate 62 which faces the tool box 61, an angle iron 78 is welded to the web part of the plate 62 and extends parallel to the horizontal top edge 67 of the latter, one flange of the angle iron 78 forming an elongated horizontal shelf at a short distance below the top edge 67. Another angle iron 79 of the same length as the angle iron 78 is welded to the side wall 46 of the battery box 19 in such relation to the angle iron 78 that the horizontal flanges of the angle irons extend in a common horizontal plane. The angle iron 79 forms a single seat support at the left side of the dual seat support 59.

The dual seat support 59 and the single seat support 79 cooperate, respectively, with opposite side portions of the driver's seat section 58 to mount the latter and the seat cushion 57 at the left side of the tractor in vertically adjustable relation to the battery box 19 and dual seat support 59. A vertical series of horizontal channels 81 and another series of horizontal channels 82 (Fig. 2) are connected with the right and left vertical side portions, respectively, of the seat section 58, and Fig. 2 shows the driver's seat 57, 58 adjusted to a minimum height above the floor plate 17. If it is desired to adjust the driver's seat to a higher position, the seat section 58 may be pulled forwardly out of engagement with the angle irons 78 and 79, and it may then be reinstalled in an elevated position by moving it back between the angle irons 78 and 79, as indicated in Fig. 4.

A back rest cushion 83 of the same width transversely of the tractor as the seat cushion 57 is secured in rear of the latter to the vertical front wall of the fuel tank 22, as shown in Figs. 1 and 2.

Features of the adjustable height driver's seat disclosed herein are claimed in an application of Bernard J. Murphy, Serial Number 24,195, filed on April 30, 1948, for Adjustable Height Vehicle Seat.

Figure 7:
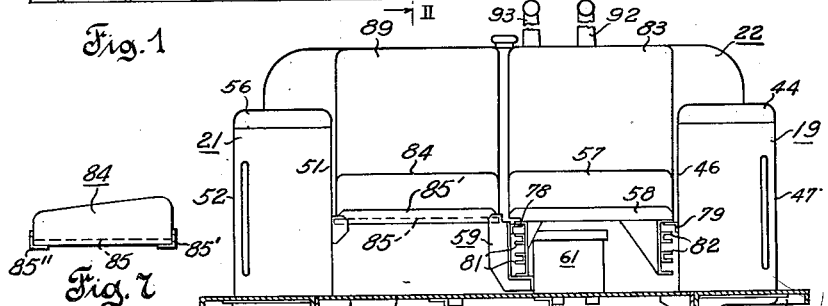
Fig. 7 is a side view of a seat cushion shown in Fig. 2.

Referring to Fig. 2, an auxiliary seat structure for accommodating a companion next to the driver in a forwardly facing position at the right side of the tractor comprises a companion's seat section in the form of a seat cushion 84 which is a duplicate of the seat cushion 57 and which is removably installed at the right side of the tractor between the dual seat support 59 and a single seat support on the battery box 21. The seat cushion 84 includes a rigid, rectangular upholstery frame which is made up of a board 85 and a pair of angle irons 85' and 85". As shown in Figs. 2 and 7, the angle iron 85' has a vertical flange which extends longitudinally of the board 85 at the front side of the seat cushion 84, and a horizontal flange which extends rearwardly under and is fastened to the board 85. Similarly, the angle iron 85" has a vertical flange which extends longitudinally of the board 85 at the rear side of the seat cushion 84, and a horizontal flange which extends forwardly under and is fastened to the board 85. The length of the board 85 and of each of the angle irons 85' and 85" is somewhat less than the spacings of the side stops 73, 77 (Fig. 5) from the wall 51 of the battery box 21, and the width of the seat frame measured between the outside faces of the front and rear angle irons 85', 85" is somewhat less than the spacing between the front and rear stops 71, 76, respectively, of the dual seat support 59 shown in Fig. 6, and somewhat less than the spacing between the front and rear plates 87, 88 shown in Fig. 3. The wing portions 70 and 74 of the dual seat support 59 provide front and rear shelves on which the upholstery frame of the seat cushion 84 rests at its forward and rearward corners adjacent to the center of the tractor. The frame edge of the seat cushion 84 adjacent to the battery box 21 rests on the single seat support, which, as stated, is secured to the battery box 21. As best shown in Figs. 3 and 4, the single seat support on the battery box 21 comprises a horizontal metal strap 86 which is welded on edge to the wall 51 of the battery box 21, and a pair of vertical front and rear plates 87 and 88 (Figs. 3 and 4) which are welded to the wall 51 of the battery box 21 and to the opposite ends of the bracket strap 86. The front and rear plates 87 and 88 of the single seat support on the battery box 21 and the front and rear stops 71 and 76 (Fig. 5) of the dual seat support 59 cooperate with the forward and rearward frame edges of the seat cushion 84 to limit back and forth movement of the seat cushion 84. Lateral shifting of the seat cushion 84 transversely of the tractor is limited by the side wall 51 of the battery box 21 and by the side stops 73 and 77 (Fig. 5) of the dual seat support 59. It will be noted that the described mounting of the cushion 84 permits ready installation of the companion's seat in the operative position in which it is shown in Fig. 2, and also ready removal of the companion's seat from said operative position, it being only necessary, in order to remove the companion's seat, to lift it from the wing portions 70 and 74 of the dual seat support 59 and from the strap 86 of the single seat support on the battery box 21. Another back rest cushion 89, which is a duplicate of the back rest 83, is secured to the front wall of the fuel tank 22 at the right side of the tractor and next to the back rest 83.

Figs. 1 and 3 show a winch mechanism, generally designated by the reference character 91, which is mounted on the transmission housing 3 at the rear of the tractor. The winch mechanism is of a well-known type which is commonly used in conjunction with crawler tractors. A conventional power take-off of the tractor is designated by the reference character 94 in Fig. 1, and the winch mechanism has a power input shaft 95 which is connectable with and disconnectable from the power take-off 94 by a conventional sleeve coupling 96. The winch mechanism has two cable drums for operating a self-loading scraper or other equipment which may be hitched to or mounted on the tractor, and the winch mechanism 91 also includes two control levers 92 and 93 which extend upwardly behind the fuel tank 22 and whose handle ends extend forward over the top of the fuel tank.

In order to operate the tractor, a driver may take a normal forwardly facing driving position on the seat cushion 57, that is, at the left side of the tractor and directly behind the steering levers 27 and 28 and brake pedals 32 and 33. In this position the driver may operate the steering levers 27 and 28 with his left and right hand, respectively, and the brake pedals 32 and 33 with his left and right foot, respectively. Assuming that the seat cushion 84 is installed in the operative position in which it is shown in Fig. 2, a companion may place himself on the seat cushion 84 at the right side of the tractor in a normal forwardly facing position. The padded lids 44 and 56 of the battery boxes serve as arm rests for the driver and companion, respectively.

When the tractor is used in conjunction with trailing equipment, such as a self-loading scraper, it may be necessary for the driver to frequently turn around in order to observe the trailing equipment and to adjust it from time to time by manipulation of the winch control levers 92 and 93. Under these circumstances, the seat cushion 84 at the right side of the tractor is preferably removed from the support 59 and strap 86, and stored at some other place. As a result of the removal of the seat cushion 84, a leg space will be exposed at the right side of the driver's seat, and the driver will have room to turn from the mentioned normal forwardly facing driving position into another driving position on the seat cushion 57 in which he faces toward the right side of the tractor, and in which he may place his right foot into a convenient position on the floor area between the battery box 21 and the support 59, and his left foot into a convenient position forwardly of the seat cushion 57. In such other or turned driving position, the driver may conveniently look to the right in order to observe the trailing equipment or to the left in order to observe the direction of travel of the tractor. If it is necessary to manipulate the control levers 92 and 93 of the winch mechanism, the driver, while seated in said turned driving position, may conveniently reach and operate these levers, and if it is necessary to change the direction of travel of the tractor, the driver while seated in said turned driving position, may reach and operate the steering levers 27 and 28 with his left hand and the brake pedals 32 and 33 with his left foot. In this manner, the driver will be able to operate the tractor and the trailing equipment properly and for long periods of operation without undue fatigue. If desired, the seat cushion 84 may be placed on top of the seat cushion 57 in order to raise the driver and give him a better field of vision from his turned driving position. The single seat support 86, 87, 88 is mounted on the battery box 21 opposite to and at a predetermined distance from the dual seat support or shelf structure 59, so that upon removal of the companion's seat section 84 there will be no cross brace or other objectionable obstruction in the space between the battery box 21 and the shelf structure 59.

It will be noted that in the herein disclosed embodiment of the invention driver operated tractor controls, which include the steering levers 27, 28 and the brake pedals 32, 33, are mounted at a rearwardly located operator's station on the tractor, and that a driver's seat which includes the seat cushion 57 and the seat frame 58 is mounted at said station rearwardly of said tractor controls. A back rest structure which includes the fuel tank 22 and the two back rest cushions 88 and 89 is mounted on and extends transversely of the tractor and has a portion 88 in rear of the driver's seat, and another portion 89 at one side of the driver's seat. A companion's seat section 84 includes a frame structure 85, 85', 85" which is engageable with shelf means 70, 74, 86 on the tractor so as to removably support the companion's seat section in an operative position forwardly of the other portion 89 of the back rest structure and in overlying relation to a leg space at said one side of the driver's seat. The tractor has a drawbar 9 for hitching trailing equipment thereto, and a power take-off 94 which is connectable with a power unit 91 for operating such trailing equipment. Upon removal of the companion's seat section 84 from its operative position a driver may place himself into a sidewise position on the driver's seat for forward observation of the tractor and rearward observation of the trailing equipment, and for manipulation of said tractor controls and of a control element which is represented by the control lever 92 or 93 and which is connected with the power unit 91 and located rearwardly of the driver's seat.

It should be understood that it is not intended to limit the invention to the hereinabove described forms and details, and that the invention includes such other forms and modifications as are embraced by the scope of the appended claims.

It is claimed and desired to secure by Letters Patent:

1. In a tractor, the combination of a drawbar for hitching trailing equipment to said tractor, a rearward operator's compartment comprising a pair of side members mounted on and extending longitudinally at opposite sides, respectively, of said tractor in transversely spaced relation to each other and affording arm rests of said operator's compartment, a back rest structure extending transversely between said side members, a shelf structure mounted on and extending longitudinally of said tractor intermediate said side members and forwardly of said back rest structure, a driver's seat supported at its opposite sides on said shelf structure and on one of said side members, respectively; seat supporting means mounted on the other of said side members opposite to and at a predetermined distance from said shelf structure, a companion's seat section having opposite side portions adapted to rest on said shelf structure and on said seat supporting means, respectively, so that said companion's seat section will be supported in an operative installed position adjacent to said driver's seat, and so that removal of said companion's seat section from said installed position will expose a leg space between said driver's seat and said other side member; driver operated tractor controls mounted at said station forwardly of said driver's seat; and a power take-off on said tractor connectable with a power unit including a control element rearwardly of said back rest structure, for operating said trailing equipment; so that upon removal of said companion's seat section a driver may place himself into a sidewise position on said driver's seat for forward observation of said tractor and rearward observation of said trailing equipment and for manipulation of said tractor controls and of said control element of said power unit.

2. In a tractor, the combination of a drawbar for hitching trailing equipment to said tractor, a power take-off on said tractor connectable with a power unit for operating said trailing equipment, driver operated tractor controls mounted at a rearwardly located operator's station on said tractor, a driver's seat mounted on said station rearwardly of said tractor controls, a control element connected with said power unit and located rearwardly of said driver's seat; a back rest structure mounted on and extending transversely of said tractor and having a portion in rear of said driver's seat and another portion at one side of said driver's seat, a companion's seat section including a frame structure, shelf means on said tractor engageable with said frame structure so as to removably support said companion's seat section in an operative position forwardly of said other portion of said back rest structure and in overlying relation to a leg space at said one side of said driver's seat, so that upon removal of said companion's seat section from its operative position a driver may place himself into a sidewise position on said driver's seat for forward observation of said tractor and rearward observation of said trailing equipment and for manipulation of said tractor controls and of said control element.

3. In a tractor, the combination of driver operated tractor controls mounted at a rearwardly located operator's station on said tractor, driver operated equipment controls mounted on said tractor in rearwardly spaced relation to said tractor controls, a driver's seat mounted on said tractor rearwardly of said tractor controls and forwardly of said equipment controls, a back rest structure mounted on and extending transversely of said tractor and having a portion in rear of said driver's seat and another portion at one side of said driver's seat, a companion's seat section including a frame structure, shelf means on said tractor engageable with said frame structure so as to removably support said companion's seat section in an operative position forwardly of said other portion of said back rest structure and in overlying relation to a leg space at said one side of said driver's seat, so that upon removal of said companion's seat section from its operative position a driver may place himself into a sidewise position on said driver's seat for manipulating said tractor and equipment controls.

VANDER M. DOBEUS.

REFERENCES CITED

The following references are of record in the file of this patent:

UNITED STATES PATENTS

| Number | Name | Date |
| --- | --- | --- |
| 1,177,951 | Hupp | Apr. 4, 1916 |
| 1,803,400 | Moore | May 5, 1931 |
| 1,945,169 | Walker | Jan. 30, 1934 |
| 1,985,169 | Howell et al. | Dec. 18, 1934 |
| 2,275,391 | Lawler | Mar. 3, 1942 |

FOREIGN PATENTS

| Number | Country | Date |
| --- | --- | --- |
| 2,108 | Great Britain | Feb. 11, 1888 |